W. F. GRUPE.
BELT.
APPLICATION FILED OCT. 3, 1918.
1,403,859. Patented Jan. 17, 1922.
Fig. 1
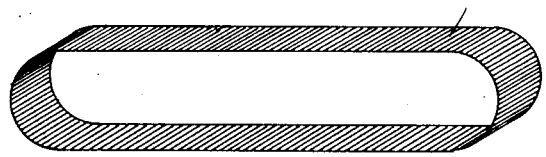
Fig. 2
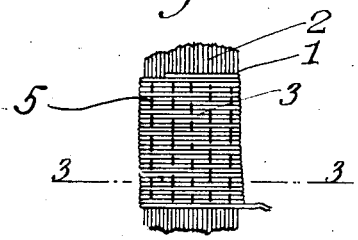
Fig. 3
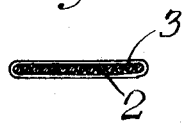
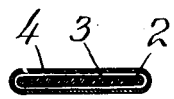
Fig. 4
INVENTOR
William F. Grupe
BY
Harry J. Lucke
his ATTORNEY

UNITED STATES PATENT OFFICE.

WILLIAM F. GRUPE, OF HUDSON HEIGHTS, NEW JERSEY, ASSIGNOR TO ENDLESS BELT CORPORATION, INC., A CORPORATION OF NEW YORK.

BELT.

1,403,859.   Specification of Letters Patent.   Patented Jan. 17, 1922.

Application filed October 3, 1918. Serial No. 256,665.

*To all whom it may concern:*

Be it known that I, WILLIAM F. GRUPE, a citizen of the United States of America, residing at Hudson Heights, county of Bergen, State of New Jersey, have invented certain new and useful Improvements in Belts, of which the following is a specification.

This invention relates to belts, preferably to endless belts.

The invention in its preferred form comprises a plurality of inwardly disposed threads extending in the direction of length of the belt and a plurality of outwardly disposed threads extending transversely of such inwardly disposed threads. The inwardly disposed threads are preferably of such number as to be in close intimate, side by side, contact when the belt is in more or less taut position; the outwardly disposed threads are preferably in similar close contact to one another.

Further features and objects of the invention will be more fully understood from the following description and the accompanying drawings, in which—

Fig. 1 shows diagrammatically a perspective view of a belt embodying my invention;

Fig. 2 is a detail top plan view of a portion of Fig. 1, certain of the outer threads being removed to show the inner threads, for the sake of clearness;

Fig. 3 is a cross sectional view on line 3—3 of Fig. 2; and

Fig. 4 is a view similar to Fig. 3 of a modification.

Referring to the drawings, the belt 1 comprises a plurality of inwardly disposed threads 2 arranged side by side, each thread 2 extending in the direction of length of the belt 1. Such threads 2 may be formed of a single continuous thread wound in convolutions, each convolution having a length substantially equal to the length of the resultant belt. The number of such threads 2 is preferably such that when the belt is in position, as indicated in Fig. 1, the threads 2 are in close, side by side, contact with one another. Such threads 2 may be formed of convolutions of a number of threads, the ends of which are either secured together, end for end, or frictionally or otherwise held within the plane or curve passing through such threads 2.

Exteriorly of the threads 2 are a plurality of transversely extending strips or threads 3, positioned side by side. Such strips or threads 3 may be formed by winding convolutions of a single strip or thread or of a number of strips or threads, whose ends are connected or secured together, end for end, or the ends held under or between two outer convolutions.

In the drawings, such outer strips of threads are shown extending substantially normally to such inner strips or threads 2; however, the relative angle of disposition of the outer and inner strips or threads may be varied as desired.

The resulting woven belt or other fabric is preferably treated with rubber, caoutchouc, gutta percha or like non-fibrous composition, saturated, wholly or partially, within the fibres of the individual strips or threads 3. The extent of inward saturation of the treating composition may be carried to the fibres of the threads 2 if desired; exteriorly, the treatment of the composition may be extended to form an outer, surrounding coating 4, as indicated in Fig. 4, whereby the entire outer faces of the belt 1 are afforded a substantially continuous coating of non-fibrous substance. The inner portion of the non-fibrous adhesive composition serves to bind the outer strips or threads 3 to the inner strips or threads 2.

Preferably, the stitchings 5 of suitable thread are sewed into the strips or threads 3, and through the inner layer of threads 2, which stitchings may be applied prior to the treatment of the belt with the aforesaid non-fibrous composition. Such stitchings are usually disposed in more or less parallel relation and extending longitudinally of the belt. The stitchings may be comparatively "coarse" to effect the general function of tending to flatten out the coacting layers of threads, comprising the outer transverse threads 3 and the inner longitudinal threads 2, which function is effected for those types of my belt which do not embody the aforesaid non-fibrous composition.

Whereas I have described my invention by reference to specific forms thereof, it will be understood that many changes and modifications may be made without departing from the spirit of the invention, as defined by the appended claims.

I claim.

1. An endless belt comprising a plurality of substantially parallel convolutions of a continuous thread or strip, said convolutions lying substantially in a common plane, a plurality of threads disposed wholly exterior of and extending transversely to said first-named threads or strips, substantial parallel stitchings extending longitudinally of the belt and a coating of non-fibrous adhesive composition.

2. An endless belt comprising a continuous thread wound spirally in convolutions, substantially the length of the belt, the convolutions lying side by side in a common plane, a second continuous thread wound spirally about the first named thread in lateral convolutions lying side by side and non-fibrous adhesive composition means for binding the threads together.

In testimony whereof I have signed this specification this 27th day of September, 1918.

WILLIAM F. GRUPE.